US012804489B2

(12) United States Patent
Pu et al.

(10) Patent No.: US 12,804,489 B2
(45) Date of Patent: Nov. 17, 2026

(54) METHOD AND APPARATUS FOR EXECUTING TARGET OPERATION, AND TERMINAL DEVICE

(71) Applicant: VIVO MOBILE COMMUNICATION CO., LTD., Guangdong (CN)

(72) Inventors: Wenjuan Pu, Guangdong (CN); Xiaodong Yang, Guangdong (CN); Xuanbing Liu, Guangdong (CN); Qian Zheng, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 315 days.

(21) Appl. No.: 18/184,201

(22) Filed: Mar. 15, 2023

(65) Prior Publication Data

US 2023/0217332 A1 Jul. 6, 2023

Related U.S. Application Data

(63) Continuation of application No. PCT/CN2021/121192, filed on Sep. 28, 2021.

(30) Foreign Application Priority Data

Sep. 30, 2020 (CN) ......................... 202011067654.8

(51) Int. Cl.
*H04W 36/06* (2009.01)
*H04W 36/00* (2009.01)

(52) U.S. Cl.
CPC ........ *H04W 36/06* (2013.01); *H04W 36/0011* (2013.01)

(58) Field of Classification Search
CPC ............. H04W 36/06; H04W 36/0011; H04W 36/362; H04W 52/0235; H04W 24/02;
(Continued)

(56) References Cited

U.S. PATENT DOCUMENTS

2015/0085712 A1* 3/2015 Wang .................... H04W 76/28 370/280
2016/0044744 A1 2/2016 Lee et al.
(Continued)

FOREIGN PATENT DOCUMENTS

CN 106538034 A 3/2017
CN 107690163 A 2/2018
(Continued)

OTHER PUBLICATIONS

3GPP TSG-RAN WG2 Meeting #111 electronic R2-2006900 e-meeting, 17th â Aug. 28, 2020 (Year: 2020).*
(Continued)

*Primary Examiner* — Nizar N Sivji
(74) *Attorney, Agent, or Firm* — Price Heneveld LLP

(57) ABSTRACT

A method includes executing a first target operation in a case that a conditional reconfiguration parameter and/or an SCG deactivation command is received at a first reception occasion, where the first reception occasion includes at least one of the following occasions: a time at which an SCG is deactivated and a time at which a conditional reconfiguration related procedure is being executed. The first target operation includes at least one of the following: skipping initiating or stopping a conditional reconfiguration evaluation procedure; initiating or continuing a conditional reconfiguration evaluation procedure; skipping initiating or stopping a conditional reconfiguration execution procedure in a case that the first condition is satisfied; postponing initiating the conditional reconfiguration evaluation procedure; postponing initiating the conditional reconfiguration execution procedure in a case that the first condition is satisfied; ignoring or deleting the conditional reconfiguration parameter; activating or deactivating the SCG; and ignoring the SCG deactivation command.

12 Claims, 4 Drawing Sheets

(58) Field of Classification Search
CPC ......... H04W 52/0206; H04W 74/0808; H04W 76/18; H04L 5/001; Y02D 30/70
See application file for complete search history.

(56) References Cited

U.S. PATENT DOCUMENTS

| | | | | |
|---|---|---|---|---|
| 2017/0170942 | A1 | 6/2017 | Qiu et al. | |
| 2020/0045602 | A1* | 2/2020 | Jiang | H04W 36/0058 |
| 2020/0337110 | A1* | 10/2020 | Kim | H04W 76/28 |
| 2021/0385766 | A1* | 12/2021 | Manolakos | H04W 52/0274 |
| 2022/0046502 | A1 | 2/2022 | Chen | |
| 2022/0086704 | A1 | 3/2022 | Futaki et al. | |
| 2022/0210739 | A1* | 6/2022 | Yi | H04L 5/0037 |
| 2022/0369173 | A1 | 11/2022 | Deng | |
| 2023/0217525 | A1* | 7/2023 | Kim | H04W 76/15 370/329 |
| 2023/0232494 | A1* | 7/2023 | Wang | H04W 76/15 370/329 |

FOREIGN PATENT DOCUMENTS

| | | | |
|---|---|---|---|
| CN | 110198553 | A | 9/2019 |
| CN | 110545567 | A | 12/2019 |
| CN | 110932835 | A | 3/2020 |
| CN | 111225396 | A | 6/2020 |
| CN | 111615156 | A | 9/2020 |
| CN | 113676965 | A | 11/2021 |
| JP | 2017528954 | A | 9/2017 |
| JP | 2023543542 | A | 10/2023 |
| WO | 2018062957 | A1 | 4/2018 |
| WO | 2020144919 | A1 | 7/2020 |
| WO | 2020145736 | A1 | 7/2020 |
| WO | 2020145778 | A1 | 7/2020 |
| WO | 2022021101 | A1 | 2/2022 |

OTHER PUBLICATIONS

3GPP TSG-RAN WG2 Meeting #111-e R2- 2007748 E-meeting, Aug. 17 â Aug. 28, 2020 (Year: 2020).*
CN_107690163_A (Year: 2018).*
CN 107690163 A (Year: 2016).*
CN 111225396 B (Year: 2020).*
CN 113676965 A (Year: 2020).*
LG Electronics Inc., "Consideration of SCG Failure with CPC", 3GPP TSG-RAN WG2 Meeting #109, R2-2001538, Revision of R2-1916207, E-Meeting, Feb. 24-Mar. 6, 2020.
Samsung, "Discussion on PCP configuration handling during SCG Release", 3GPP TSG RAN WG2 Meeting #109-e-bis, R2-2003327, e-Meeting, Apr. 20-30, 2020.
LG Electronics Inc., "Draft CR for clarification to Release CPC when SCG release", 3GPP TSG-RAN WG2 Meeting #110-e, R2-2005683, Online, Jun. 1-12, 2020.
CATT, "Further correction on UEAssistanceInformation upon reconfiguration with sync", 3GPP TSG-RAN WG2 Meeting #111 electronic, R2-2006987, Online, Aug. 17-28, 2020.
CATT, "Efficient Activation/Deactivation Mechanism for SCG and SCells", 3GPP TSG-RAN WG2 Meeting #111 electronic, R2-2007009, Online, Aug. 17-28, 2020.
ZTE Corporation, Sanechips, "Framework of SCG deactivation and activation", 3GPP TSG-RAN WG2 Meeting #111 electronic, R2-2006900, e-meeting, Aug. 17-28, 2020.
Vivo, "Efficient activation/deactivation mechanism for SCG and SCells", 3GPP TSG-RAN WG2 Meeting #111 electronic, R2-2007215, E-Meeting, Aug. 17-28, 2020.
Samsung, "Further enhancements regarding deactivation and resumption for R17", 3GPP TSG-RAN WG2#111, R2-2007623, Electronic, Aug. 17-28, 2020.
Qualcomm Incorporated, "Efficient SCG activation/deactivation in MR-DC", 3GPP TSG-RAN WG2 Meeting #111, R2-2007748, E-meeting, Aug. 17-28, 2020.
Second Indian Office Action for Indian Patent Application No. 202317030096, dated Jul. 1, 2026, 3 pages.

* cited by examiner

METHOD AND APPARATUS FOR EXECUTING TARGET OPERATION, AND TERMINAL DEVICE

CROSS-REFERENCE TO RELATED APPLICATIONS

The present invention is a continuation application of International Application No. PCT/CN2021/121192 filed on Sep. 28, 2021, which claims priority to Chinese Patent Application No. 202011067654.8, filed with the China National Intellectual Property Administration on Sep. 30, 2020 and entitled "METHOD AND APPARATUS FOR EXECUTING TARGET OPERATION, AND TERMINAL DEVICE", which are incorporated herein by reference in their entireties.

TECHNICAL FIELD

Embodiments of the present invention relate to the field of communications, and in particular, to a method and an apparatus for executing a target operation, and a terminal device.

BACKGROUND

For power saving and subsequent quick activation, a network may instruct user equipment (UE) to set a secondary cell group (SCG) to a deactivated state. The network configures a conditional reconfiguration related procedure for the UE to implement robustness and low latency in mobility management. For example, a conditional reconfiguration parameter of a candidate primary secondary cell PSCell) configured by a secondary base station is used for executing a conditional PSCell change (CPC) related procedure by the terminal.

Two functions including conditional reconfiguration and SCG deactivation may be configured or indicated to the UE by the network simultaneously or successively. However, the two functions impose some impact on each other during execution by the UE to make behavior of the UE unclear, resulting in inconsistent understanding between the network and the UE and leading to exceptions in subsequent communication.

SUMMARY

Embodiments of this application provide a method and an apparatus for executing a target operation, and a terminal device.

According to a first aspect, a method for executing a target operation is provided, where the method is executed by a terminal device, and the method includes: executing a first target operation in a case that a conditional reconfiguration parameter and/or an SCG deactivation command is received at a first reception occasion, where the first reception occasion includes at least one of the following occasions: a time at which an SCG is deactivated, a time at which a conditional reconfiguration related procedure is being executed, and a time at which an SCG is deactivated and a conditional reconfiguration related procedure is being executed; and the first target operation includes at least one of the following: skipping initiating a conditional reconfiguration evaluation procedure; stopping a conditional reconfiguration evaluation procedure; initiating a conditional reconfiguration evaluation procedure; continuing a conditional reconfiguration evaluation procedure; skipping initiating a conditional reconfiguration execution procedure in a case that a first condition is satisfied; stopping a conditional reconfiguration execution procedure in a case that the first condition is satisfied; postponing initiating a conditional reconfiguration evaluation procedure; postponing initiating a conditional reconfiguration execution procedure in a case that the first condition is satisfied; ignoring the conditional reconfiguration parameter; deleting the conditional reconfiguration parameter; activating or deactivating the SCG; and ignoring the SCG deactivation command.

According to a second aspect, an apparatus for executing a target operation is provided, where the apparatus includes: an execution module, configured to execute a first target operation in a case that a conditional reconfiguration parameter and/or an SCG deactivation command is received at a first reception occasion, where the first reception occasion includes at least one of the following occasions: a time at which an SCG is deactivated, a time at which a conditional reconfiguration related procedure is being executed, and a time at which an SCG is deactivated and a conditional reconfiguration related procedure is being executed; and the first target operation includes at least one of the following: skipping initiating a conditional reconfiguration evaluation procedure; stopping a conditional reconfiguration evaluation procedure; initiating a conditional reconfiguration evaluation procedure; continuing a conditional reconfiguration evaluation procedure; skipping initiating a conditional reconfiguration execution procedure in a case that a first condition is satisfied; stopping a conditional reconfiguration execution procedure in a case that the first condition is satisfied; postponing initiating a conditional reconfiguration evaluation procedure; postponing initiating a conditional reconfiguration execution procedure in a case that the first condition is satisfied; ignoring the conditional reconfiguration parameter; deleting the conditional reconfiguration parameter; activating or deactivating the SCG; and ignoring the SCG deactivation command.

According to a third aspect, a terminal device is provided, where the terminal device includes a processor, a memory, and a program or instructions stored in the memory and capable of running on the processor, and when the program or the instructions are executed by the processor, the steps of the method according to the first aspect are implemented.

According to a fourth aspect, a readable storage medium is provided, where a program or an instruction is stored in the readable storage medium, and when the program or the instruction is executed by a processor, the steps of the method according to the first aspect are implemented.

According to a fifth aspect, a computer program product is provided, where the computer program product includes a processor, a memory, and a program or instructions stored in the memory and capable of running on the processor, and when the program or the instructions are executed by the processor, the steps of the method according to the first aspect are implemented.

According to a sixth aspect, an embodiment of this application provides a chip, where the chip includes a processor and a communications interface, the communications interface is coupled to the processor, and the processor is configured to run a program or an instruction to implement the method according to the first aspect.

The embodiments of this application provide a method and an apparatus for executing a target operation, and a terminal device. The first target operation is executed in a case that the conditional reconfiguration parameter and/or the SCG deactivation command is received at the first reception occasion, where the first reception occasion includes at least one of the following occasions: a time at which the SCG is deactivated, a time at which the conditional reconfiguration related procedure is being executed, and a time at which an SCG is deactivated and a conditional reconfiguration related procedure is being executed. The first target operation includes at least one of the following: skipping initiating the conditional reconfiguration evaluation procedure; stopping the conditional reconfiguration evaluation procedure; initiating the conditional reconfiguration evaluation procedure; continuing the conditional reconfiguration evaluation procedure; skipping initiating a conditional reconfiguration execution procedure in a case that the first condition is satisfied; stopping a conditional reconfiguration execution procedure in a case that the first condition is satisfied; postponing initiating the conditional reconfiguration evaluation procedure; postponing initiating a conditional reconfiguration execution procedure in a case that the first condition is satisfied; ignoring the conditional reconfiguration parameter; deleting the conditional reconfiguration parameter; activating or deactivating the SCG; and ignoring the SCG deactivation command.

BRIEF DESCRIPTION OF THE DRAWINGS

The accompanying drawings described herein are intended for better understanding of this application and constitute a part of this application. Illustrative embodiments and descriptions thereof in this application are intended to interpret this application without constituting any improper limitation on this application. In the accompanying drawings.

DESCRIPTION OF EMBODIMENTS

The following clearly describes the technical solutions in the embodiments of this application with reference to the accompanying drawings in the embodiments of this application. Apparently, the described embodiments are only some rather than all of the embodiments of this application. All other embodiments obtained by a person of ordinary skill in the art based on the embodiments of this application without creative efforts shall fall within the protection scope of this application.

In the specification and claims of this application, the terms such as "first" and "second" are intended to distinguish between similar objects but do not necessarily indicate a specific order or sequence. It should be understood that the terms used in this way is interchangeable in appropriate circumstances so that the embodiments of this application can be implemented in other orders than the order illustrated or described herein. In addition, "and/or" in this specification and claims indicates at least one of connected objects, and the symbol "/" generally indicates that the associated objects are in an "or" relationship.

It should be noted that technologies described in the embodiments of this specification are not limited to a long term evolution (LTE) or LTE-Advanced (LTE-A) system, and may also be applied to other wireless communications systems, for example, code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application are usually used interchangeably. Techniques described herein may be used in the aforementioned systems and radio technologies, and may also be used in other systems and radio technologies. However, in the following descriptions, a new radio (NR) system is described for an illustration purpose, and NR terms are used in most of the following descriptions, although these technologies may also be applied to other applications than an NR system application, for example, the 6th generation (6G) communications system.

Figure 1:
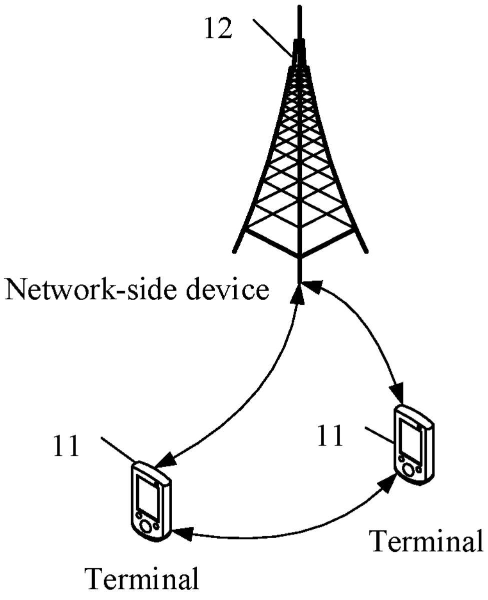
FIG. 1 is a block diagram of a wireless communications system to which the embodiments of this application are applicable.

FIG. 1 is a block diagram of a wireless communications system to which the embodiments of this application are applicable. The wireless communications system includes a terminal 11 and a network-side device 12. The terminal 11 may also be referred to as a terminal device or a user terminal, and the terminal 11 may be a terminal-side device, such as a mobile phone, a tablet computer, a laptop computer or a notebook computer, a personal digital assistant (PDA), a palmtop computer, a netbook, an ultra-mobile personal computer (UMPC), a mobile Internet device (MID), a wearable device or vehicle user equipment (VUE), or pedestrian user equipment (PUE). The wearable device includes: a wrist band, earphones, glasses, or the like. It should be noted that a specific type of the terminal 11 is not limited in the embodiments of this application. The network-side device 12 may be a base station or a core network. The base station may be referred to as an access point, a base transceiver station (BTS), a radio base station, a radio transceiver, a basic service set (BSS), an extended service set (ESS), a NodeB, an evolved NodeB (eNB), a home NodeB, a home evolved NodeB, a WLAN access point, a Wi-Fi node, a transmission and reception Point (TRP), or another appropriate term in the art. Provided that a same technical effect is achieved, the base station is not limited to a specific technical term. It should be noted that in the embodiments of this application, the base station in the NR system is merely used as an example, and a specific type of the base station is not limited.

The following describes in detail a method for executing a target operation provided in the embodiments of this application by using specific embodiments and application scenarios thereof with reference to the accompanying drawings.

Figure 2:
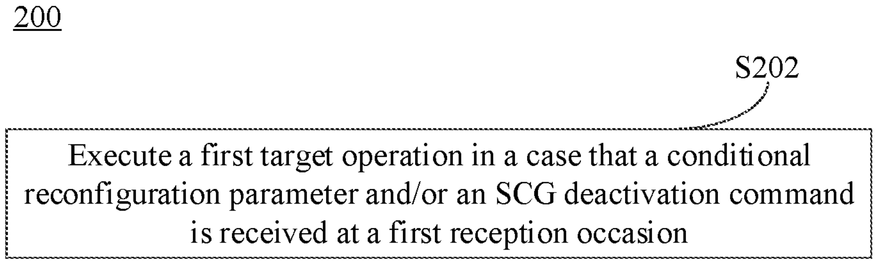
FIG. 2 is a schematic flowchart of a method for executing a target operation according to an embodiment of the present invention.

As shown in FIG. 2, an embodiment of the present invention provides a method 200 for executing a target operation. The method 200 may be executed by a terminal device. In other words, the method 200 may be executed by software or hardware installed in the terminal device. The method 200 includes the following step.

S202: Execute a first target operation in a case that a conditional reconfiguration parameter and/or an SCG deactivation command is received at a first reception occasion.

The first reception occasion includes at least one of the following occasions: a time at which an SCG is deactivated, a time at which a conditional reconfiguration related procedure is being executed, and a time at which an SCG is deactivated and a conditional reconfiguration related procedure is being executed.

Conditional reconfiguration includes: CPC configuration, used for executing a CPC procedure by the UE. The CPC configuration may include: a plurality of candidate primary secondary cells (PSCell), an execution condition or a trigger event for executing CPC and corresponding to each candidate PSCell, and a radio resource control (RRC) reconfiguration message or parameter corresponding to each candidate PSCell.

The conditional reconfiguration related procedure may include: a conditional reconfiguration evaluation procedure and a conditional reconfiguration execution procedure, for example, a CPC evaluation procedure and a CPC execution procedure. Specifically, after receiving the CPC configuration, the UE maintains a connection to a source PSCell, and starts to execute a conditional reconfiguration evaluation procedure (which may also be considered as a CPC evaluation procedure), that is, to evaluate whether an execution condition or a trigger event of a candidate PSCell is satisfied. During the CPC evaluation procedure, when an execution condition or a trigger event corresponding to a candidate PSCell is satisfied, it is considered that the candidate PSCell is triggered. If at least one candidate PSCell is triggered or an execution condition or a trigger event corresponding to at least one PSCell is satisfied, the UE initiates a conditional reconfiguration execution procedure (that is, a CPC execution procedure). That is, the UE selects one triggered PSCell, applies its corresponding RRC configuration, and initiates random access to the PSCell. When SRB3 is configured, the UE may directly send an RRCReconfigurationComplete message to the selected PS Cell. When no SRB3 is configured, the UE may send ULInformationTransferMRDC to the MN, carrying an RRCReconfigurationComplete message to be sent to the selected PSCell, After the foregoing message is sent, the CPC execution procedure ends.

Regarding the SCG deactivation command, dual connectivity (DC) refers to providing UE with resources of two network nodes (access network elements), one network node being referred to as a master node (MN), and the other network node being referred to as a secondary node (SN). Carrier aggregation (CA) is used for each network node, that is, a series of serving cells controlled by the node are configured for the UE and are referred to as a cell group. Those controlled by a master node MN are a master cell group (MCG), and those controlled by a secondary node SN are a secondary cell group (SCG). Each cell group includes a special cell (SpCell) and a series of secondary cells (S cell). In the MCG, the special cell is referred to as a primary cell (PCell), and in the SCG, the special cell is referred to as a primary secondary cell (PSCell). In a cell group, an SpCell uses a primary carrier while another secondary cell uses a secondary carrier, and resource scheduling in a cell group is performed by the SpCell.

Based on this, an SCG suspended state is introduced. When the UE has a small amount of data or no data to be transmitted for a period of time, the network may temporarily suspend the SCG, instead of directly deleting the SCG, and then add it back when a large amount of data is present. Temporarily suspending the SCG may enable the terminal device to work in a more power-saving manner for a longer period of time, and to quickly resume the SCG when a large amount of data demand is present. In an implementation, this is also referred to as SCG deactivation state. In the SCG deactivation state, some behaviors of the UE on the SCG are restricted to save power consumption of the UE. For example, during the SCG deactivated period, the UE does not monitor a PDCCH (including a PSCell) on the SCG.

Then, in a case that the conditional reconfiguration parameter and/or the SCG deactivation command is received at the first reception occasion, if the UE behavior cannot be determined, conditional reconfiguration may be executed and SCG deactivation may also be executed, imposing mutual impact on the two functions and resulting in some adverse effects due to inconsistent understanding on transmission between the network and the UE. For example, when the UE executes the CPC, the UE receives an SCG deactivation command. If the UE chooses to continue to execute the CPC and ignore the SCG deactivation command, the network side instead considers that the UE has executed the SCG deactivation command, and consequently the UE keeps monitoring a physical downlink control channel (PDCCH) of the SCG. However, the SN does not actually schedule the UE, resulting in unnecessary power consumption of the UE. Alternatively, for example, in some scenarios, data transmission between the network and the UE may fail.

In view of this, in this step, the first target operation includes at least one of the following: skipping initiating a conditional reconfiguration evaluation procedure; stopping a conditional reconfiguration evaluation procedure; initiating a conditional reconfiguration evaluation procedure; continuing a conditional reconfiguration evaluation procedure; skipping initiating a conditional reconfiguration execution procedure in a case that a first condition is satisfied; stopping a conditional reconfiguration execution procedure in a case that the first condition is satisfied; postponing initiating a conditional reconfiguration evaluation procedure; postponing initiating a conditional reconfiguration execution procedure in a case that the first condition is satisfied; ignoring the conditional reconfiguration parameter; deleting the conditional reconfiguration parameter; activating or deactivating the SCG; and ignoring the SCG deactivation command.

In an implementation, in a case that the UE does not initiate the conditional reconfiguration evaluation procedure and the first condition is satisfied, the UE skips initiating the conditional reconfiguration execution procedure. This may alternatively be expressed directly as that the UE skips initiating the conditional reconfiguration related procedure or stops the conditional reconfiguration related procedure. The conditional reconfiguration related procedure includes: a conditional reconfiguration evaluation procedure, a conditional reconfiguration execution procedure, and any subprocedure related to a conditional reconfiguration message/parameter.

In an implementation, the postponing initiating the conditional reconfiguration execution procedure includes at least one of the following:

- initiating the conditional reconfiguration execution procedure in a case that there is data or signaling to be sent on an SCG bearer, a secondary node terminated bearer (SN terminated bearer), or a master cell group MCG bearer;
- initiating the conditional reconfiguration execution procedure in a case that the SCG has been activated;

initiating the conditional reconfiguration execution procedure in a case that an SCG activation command has been activated; and initiating the conditional reconfiguration execution procedure in a case that the SCG is deactivated and an MCG radio link fails. In this case, if there is a triggered PSCell, the UE may select one of the triggered PSCells to initiate random access. During access to the selected PSCell or after the access is completed, it may be considered by default that the SCG has been activated or the UE may add indication information to indicate to the network to activate the SCG. Further, the UE may alternatively indicate MCG failure information to the network side, for example, the UE indicates, during access, to the PSCell to activate the SCG and reports the MCG failure information, or the UE reports the MCG failure information after the access.

In an implementation, the postponing initiating the conditional reconfiguration evaluation procedure includes: storing a CPC configuration; setting a target parameter to a predetermined value; and initiating a conditional reconfiguration evaluation procedure and/or a conditional reconfiguration execution procedure in a case that a second condition is satisfied, where the second condition includes at least one of the following: after the SCG is activated; an SCG activation command has been received and the target parameter is the predetermined value; and the SCG is deactivated and the MCG radio link fails.

For example, the conditional reconfiguration parameter is received when the SCG is deactivated, where the conditional reconfiguration parameter includes information about a candidate PSCell. In this case, the UE determines to postpone the conditional reconfiguration evaluation procedure and sets the target parameter PendingCPC to TRUE. Then, when the UE receives the SCG activation command and PendingCPC=TRUE, the UE can activate the SCG and initiate the CPC evaluation procedure.

In an implementation, the first condition includes: that at least one candidate cell indicated in conditional reconfiguration is triggered; or that a target event corresponding to at least one candidate cell indicated in conditional reconfiguration is satisfied.

In an implementation, the conditional reconfiguration execution procedure includes the following content:

determining a first target cell, where the first target cell includes a cell indicated in the conditional reconfiguration;

applying an RRC reconfiguration message or parameter corresponding to the first target cell;

establishing synchronization with the first target cell;

initiating random access to the first target cell; and sending an RRC message to the first target cell.

According to the method for executing a target operation in this embodiment of this application, the first target operation is executed in a case that the conditional reconfiguration parameter and/or the SCG deactivation command is received at the first reception occasion, where the first reception occasion includes at least one of the following occasions: a time at which the SCG is deactivated, a time at which the conditional reconfiguration related procedure is being executed, and a time at which an SCG is deactivated and a conditional reconfiguration related procedure is being executed. The first target operation includes at least one of the following: skipping initiating the conditional reconfiguration evaluation procedure; stopping the conditional reconfiguration evaluation procedure; initiating the conditional reconfiguration evaluation procedure; continuing the conditional reconfiguration evaluation procedure; skipping initiating a conditional reconfiguration execution procedure in a case that the first condition is satisfied; stopping a conditional reconfiguration execution procedure in a case that the first condition is satisfied; postponing initiating the conditional reconfiguration evaluation procedure; postponing initiating a conditional reconfiguration execution procedure in a case that the first condition is satisfied; ignoring the conditional reconfiguration parameter; deleting the conditional reconfiguration parameter; activating or deactivating the SCG; and ignoring the SCG deactivation command. This can make behavior of the UE clear and implement consistent understanding between the network and the UE in a case that two functions including conditional reconfiguration and SCG deactivation are configured or indicated to the UE by the network simultaneously or successively, thereby avoiding adverse effects caused by inconsistent understanding on transmission between the network and the UE.

Figure 3:
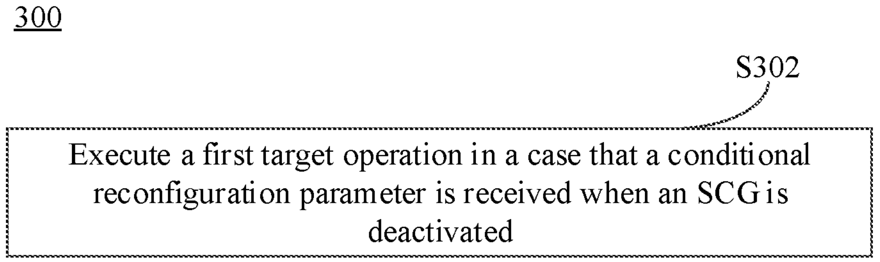
FIG. 3 is a schematic flowchart of a method for executing a target operation according to an embodiment of the present invention.

As shown in FIG. 3, an embodiment of the present invention provides a method 300 for executing a target operation. The method 300 may be executed by a terminal device. In other words, the method 300 may be executed by software or hardware installed in the terminal device. The method 300 includes the following step.

S302: Execute a first target operation in a case that a conditional reconfiguration parameter is received when an SCG is deactivated.

Then, in a case that the conditional reconfiguration parameter is received when the SCG is deactivated, if the UE behavior cannot be determined, conditional reconfiguration may be executed and SCG deactivation may also be executed, imposing mutual impact on the two functions and resulting in some adverse effects due to inconsistent understanding on transmission between a network and UE.

In view of this, in this step, the first target operation includes at least one of the following: skipping initiating a conditional reconfiguration evaluation procedure; initiating the conditional reconfiguration evaluation procedure; skipping initiating a conditional reconfiguration execution procedure in a case that a first condition is satisfied; postponing initiating the conditional reconfiguration evaluation procedure; postponing initiating the conditional reconfiguration execution procedure in a case that the first condition is satisfied; ignoring the conditional reconfiguration parameter; and activating the SCG.

In an implementation, when the SCG is in the deactivated state, the UE receives a conditional reconfiguration parameter including a candidate PSCell. In this case, the UE considers that the PSCell reconfiguration parameter implicitly indicates the UE to activate the SCG, and then when receiving the conditional reconfiguration, the UE activates the SCG and initiates the CPC evaluation procedure.

Specific implementations of the processes included in the first target operation can be described in the same manner as those in the embodiment of FIG. 2, and details are not repeated herein.

Therefore, according to the method for executing a target operation provided in this embodiment of the present invention, the first target operation is executed in a case that the conditional reconfiguration parameter is received when the SCG is deactivated. The first target operation includes at least one of the following: skipping initiating the conditional reconfiguration evaluation procedure; initiating the conditional reconfiguration evaluation procedure; skipping initiating the conditional reconfiguration execution procedure in a case that the first condition is satisfied; postponing initiating the conditional reconfiguration evaluation procedure;

postponing initiating the conditional reconfiguration execution procedure in a case that the first condition is satisfied; ignoring the conditional reconfiguration parameter; and activating the SCG. This can make behavior of the UE clear and implement consistent understanding between the network and the UE in a case that the conditional reconfiguration parameter is received when the SCG is deactivated, thereby avoiding adverse effects caused by inconsistent understanding on transmission between the network and the UE.

Figure 4:
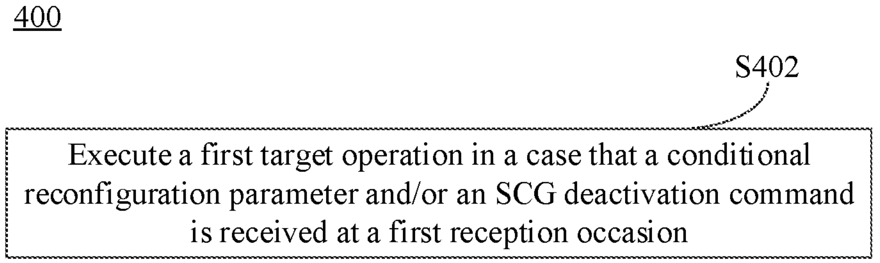
FIG. 4 is a schematic flowchart of a method for executing a target operation according to an embodiment of the present invention.

As shown in FIG. 4, an embodiment of the present invention provides a method 400 for executing a target operation. The method 400 may be executed by a terminal device. In other words, the method 400 may be executed by software or hardware installed in the terminal device. The method 400 includes the following step.

S402: Execute a first target operation in a case that a conditional reconfiguration parameter and/or an SCG deactivation command is received at a first reception occasion.

That a conditional reconfiguration parameter and/or an SCG deactivation command is received at a first reception occasion includes: both the conditional reconfiguration parameter and the SCG deactivation command are received; or the SCG deactivation command is received in a case that the conditional reconfiguration parameter has been obtained and that the conditional reconfiguration related procedure has not been executed.

In a case that the conditional reconfiguration parameter and/or the SCG deactivation command is received at the first reception occasion, if the UE behavior cannot be determined, conditional reconfiguration may be executed and SCG deactivation may also be executed, imposing mutual impact on the two functions and resulting in some adverse effects due to inconsistent understanding on transmission between the network and the UE.

In view of this, in this step, the first target operation includes at least one of the following: skipping initiating a conditional reconfiguration evaluation procedure; initiating the conditional reconfiguration evaluation procedure; skipping initiating a conditional reconfiguration execution procedure in a case that a first condition is satisfied; postponing initiating the conditional reconfiguration evaluation procedure; postponing initiating the conditional reconfiguration execution procedure in a case that the first condition is satisfied; ignoring the conditional reconfiguration parameter; deleting the conditional reconfiguration parameter; and ignoring the SCG deactivation command.

In an implementation, the UE first receives a conditional reconfiguration including a candidate PSCell, and then receives the SCG deactivation command. The UE considers that the SCG deactivation command sent by the network implicitly indicates the UE to stop executing any procedure related to CPC, or delete related conditional reconfiguration parameters.

Specific implementations of the processes included in the first target operation can be described in the same manner as those in the embodiment of FIG. 2, and details are not repeated herein.

Therefore, according to the method for executing a target operation provided in this embodiment of the present invention, the first target operation is executed in a case that the conditional reconfiguration parameter and/or the SCG deactivation command is received at the first reception occasion. The first target operation includes at least one of the following: skipping initiating the conditional reconfiguration evaluation procedure; initiating the conditional reconfiguration evaluation procedure; skipping initiating the conditional reconfiguration execution procedure in a case that the first condition is satisfied; postponing initiating the conditional reconfiguration evaluation procedure; postponing initiating the conditional reconfiguration execution procedure in a case that the first condition is satisfied; ignoring or deleting the conditional reconfiguration parameter; and ignoring the SCG deactivation command. This can make behavior of the UE clear and implement consistent understanding between the network and the UE in a case that the conditional reconfiguration parameter and the SCG deactivation command are both received or in a case that the conditional reconfiguration parameter has been obtained and that the conditional reconfiguration related procedure has not been executed, thereby avoiding adverse effects caused by inconsistent understanding on transmission between the network and the UE.

Figure 5:
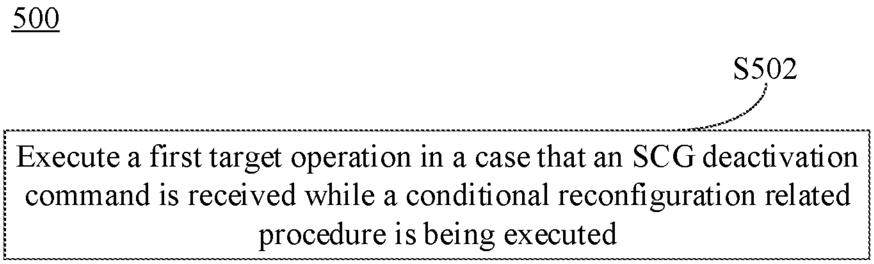
FIG. 5 is a schematic flowchart of a method for executing a target operation according to an embodiment of the present invention.

As shown in FIG. 5, an embodiment of the present invention provides a method 500 for executing a target operation. The method 500 may be executed by a terminal device. In other words, the method 500 may be executed by software or hardware installed in the terminal device. The method 500 includes the following step.

S502: Execute a first target operation in a case that an SCG deactivation command is received while a conditional reconfiguration related procedure is being executed.

In a case that the SCG deactivation command is received while the conditional reconfiguration related procedure is being executed, if the UE behavior cannot be determined, conditional reconfiguration may be executed and SCG deactivation may also be executed, imposing mutual impact on the two functions and resulting in some adverse effects due to inconsistent understanding on transmission between the network and the UE.

In view of this, in this step, the first target operation includes at least one of the following: stopping a conditional reconfiguration evaluation procedure; continuing the conditional reconfiguration evaluation procedure; stopping a conditional reconfiguration execution procedure in a case that a first condition is satisfied; postponing initiating the conditional reconfiguration execution procedure in a case that the first condition is satisfied; ignoring the SCG deactivation command; and deleting the conditional reconfiguration parameter.

In an implementation, when the UE receives the SCG deactivation command while executing a CPC evaluation procedure, the UE stops an ongoing CPC evaluation procedure. Optionally, the UE may delete the CPC conditional reconfiguration parameter, or the UE may re-initiate the CPC evaluation procedure after the SCG is activated, without deleting the parameter.

Specific implementations of the processes included in the first target operation can be described in the same manner as those in the embodiment of FIG. 2, and details are not repeated herein.

Therefore, according to the method for executing a target operation provided in this embodiment of the present invention, the first target operation is executed in a case that the SCG deactivation command is received while the conditional reconfiguration related procedure is being executed. The first target operation includes at least one of the following: stopping the conditional reconfiguration evaluation procedure; continuing the conditional reconfiguration evaluation procedure; stopping the conditional reconfiguration execution procedure in a case that the first condition is satisfied; postponing initiating the conditional reconfiguration execution procedure in a case that the first condition is satisfied; ignoring the SCG deactivation command; and deleting the conditional reconfiguration parameter. This can make behavior of the UE clear and implement consistent understanding between the network and the UE in a case that the SCG deactivation command is received while the conditional reconfiguration related procedure is being executed, thereby avoiding adverse effects caused by inconsistent understanding on transmission between the network and the UE.

It should be noted that, for the method for executing a target operation provided in the embodiments of this application, the execution subject may be an apparatus for executing a target operation, or a control module in the apparatus for executing the foregoing method. In the embodiments of this application, the method for executing a target operation being executed by an apparatus for executing a target operation is used as an example to illustrate the method for executing a target operation provided in the embodiments of this application.

Figure 6:
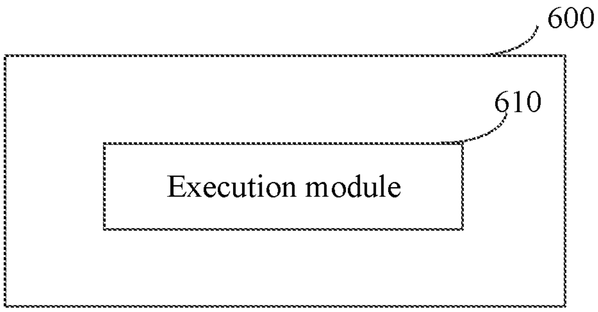
FIG. 6 is a schematic structural diagram of an apparatus for executing a target operation according to an embodiment of the present invention.

FIG. 6 is a schematic structural diagram of an apparatus for executing a target operation according to an embodiment of the present invention. As shown in FIG. 6, an apparatus 600 for executing a target operation includes: an execution module 610.

The execution module 610 is configured to execute a first target operation in a case that a conditional reconfiguration parameter and/or an SCG deactivation command is received at a first reception occasion, where the first reception occasion includes at least one of the following occasions: a time at which an SCG is deactivated, a time at which a conditional reconfiguration related procedure is being executed, and a time at which an SCG is deactivated and a conditional reconfiguration related procedure is being executed; and the first target operation includes at least one of the following: skipping initiating a conditional reconfiguration evaluation procedure; stopping a conditional reconfiguration evaluation procedure; initiating a conditional reconfiguration evaluation procedure; continuing a conditional reconfiguration evaluation procedure; skipping initiating a conditional reconfiguration execution procedure in a case that a first condition is satisfied; stopping a conditional reconfiguration execution procedure in a case that the first condition is satisfied; postponing initiating a conditional reconfiguration evaluation procedure; postponing initiating a conditional reconfiguration execution procedure in a case that the first condition is satisfied; ignoring the conditional reconfiguration parameter; deleting the conditional reconfiguration parameter; activating or deactivating the SCG; and ignoring the SCG deactivation command.

In an implementation, the apparatus 600 for executing a target operation may further include: a receiving module, where the receiving module is configured to receive a conditional reconfiguration parameter and/or an SCG deactivation command.

In an implementation, that the execution module 610 is configured to: execute the first target operation in a case that the conditional reconfiguration parameter is received when the SCG is deactivated; where the first target operation includes at least one of the following: skipping initiating the conditional reconfiguration evaluation procedure; initiating the conditional reconfiguration evaluation procedure; skipping initiating the conditional reconfiguration execution procedure in a case that the first condition is satisfied; postponing initiating the conditional reconfiguration evaluation procedure; postponing initiating the conditional reconfiguration execution procedure in a case that the first condition is satisfied; ignoring the conditional reconfiguration parameter; and activating the SCG.

In an implementation, that the execution module 610 is configured to execute a first target operation in a case that a conditional reconfiguration parameter and/or an SCG deactivation command is received at a first reception occasion includes: executing the first target operation in a case that a conditional reconfiguration parameter and/or an SCG deactivation command is received at a first reception occasion, where the first target operation includes at least one of the following: skipping initiating the conditional reconfiguration evaluation procedure; initiating the conditional reconfiguration evaluation procedure; skipping initiating the conditional reconfiguration execution procedure in a case that the first condition is satisfied; postponing initiating the conditional reconfiguration evaluation procedure; postponing initiating the conditional reconfiguration execution procedure in a case that the first condition is satisfied; ignoring or deleting the conditional reconfiguration parameter; and ignoring the SCG deactivation command. That the conditional reconfiguration parameter and/or the SCG deactivation command is received at the first reception occasion includes: both the conditional reconfiguration parameter and the SCG deactivation command are received; or the SCG deactivation command is received in a case that the conditional reconfiguration parameter has been obtained and that the conditional reconfiguration related procedure has not been executed.

In an implementation, that the execution module 610 is configured to execute a first target operation in a case that a conditional reconfiguration parameter and/or an SCG deactivation command is received at a first reception occasion includes: executing the first target operation in a case that the SCG deactivation command is received while the conditional reconfiguration related procedure is being executed, where the first target operation includes at least one of the following: stopping the conditional reconfiguration evaluation procedure; continuing the conditional reconfiguration evaluation procedure; stopping the conditional reconfiguration execution procedure in a case that the first condition is satisfied; postponing initiating the conditional reconfiguration execution procedure in a case that the first condition is satisfied; ignoring the SCG deactivation command; and deleting the conditional reconfiguration parameter.

In an implementation, that the execution module 610 is configured to postpone initiating the conditional reconfiguration execution procedure includes at least one of the following: initiating the conditional reconfiguration execution procedure in a case that there is data or signaling to be sent on an SCG bearer, a secondary node terminated bearer SN terminated bearer, or an MCG bearer; initiating the conditional reconfiguration execution procedure in a case that the SCG has been activated; initiating the conditional reconfiguration execution procedure in a case that an SCG activation command has been activated; and initiating the conditional reconfiguration execution procedure in a case that the SCG is deactivated and an MCG radio link fails.

In an implementation, that the execution module 610 is configured to initiate the conditional reconfiguration execution procedure in a case that the SCG is deactivated and an MCG radio link fails includes: initiating, for the terminal device, random access on a selected candidate cell; and activating the SCG and/or reporting MCG failure information during a random access procedure or using a radio resource control RRC reconfiguration complete message, where the selected candidate cell includes a cell that meets a corresponding trigger event in the conditional reconfiguration.

In an implementation, that the execution module 610 is configured to postpone initiating the conditional reconfiguration evaluation procedure includes: storing a CPC configuration; setting a target parameter to a predetermined value; and initiating a conditional reconfiguration evaluation procedure and/or a conditional reconfiguration execution procedure in a case that a second condition is satisfied, where the second condition includes at least one of the following: after the SCG is activated; an SCG activation command has been received and the target parameter is the predetermined value; and the SCG is deactivated and the MCG radio link fails.

In an implementation, the first condition includes: that at least one candidate cell indicated in conditional reconfiguration is triggered; or that a target event corresponding to at least one candidate cell indicated in conditional reconfiguration is satisfied.

In an implementation, the conditional reconfiguration execution procedure includes: determining a first target cell, where the first target cell includes a cell indicated in the conditional reconfiguration; applying an RRC reconfiguration message or parameter corresponding to the first target cell; establishing synchronization with the first target cell; initiating random access to the first target cell; and sending an RRC message to the first target cell.

The apparatus for executing a target operation in this embodiment of this application may be an apparatus, or may be a component, an integrated circuit, or a chip in a terminal device. The apparatus may be a mobile electronic device or a non-mobile electronic device. For example, the mobile electronic device may be a mobile phone, a tablet computer, a notebook computer, a palmtop computer, an in-vehicle electronic device, a wearable device, an ultra-mobile personal computer (UMPC), a netbook, a personal digital assistant (PDA), or the like. The non-mobile electronic device may be a server, a network-attached storage (NAS), a personal computer (PC), a television (TV), a teller machine, a self-service machine, or the like. This is not specifically limited in the embodiments of this application.

The apparatus for executing a target operation in this embodiment of this application may be an apparatus with an operating system. The operating system may be an Android operating system, an iOS operating system, or other possible operating systems, and is not specifically limited in the embodiments of this application.

For the apparatus 600 in this embodiment of the present invention, refer to the processes of the methods 200 to 500 in the corresponding embodiments of the present invention, and the units or modules of the apparatus 600 and other operations and/or functions described above are used to implement the corresponding processes in the methods 200 to 500, with the same or equivalent technical effects achieved. For brevity, details are not repeated herein.

Figure 7:
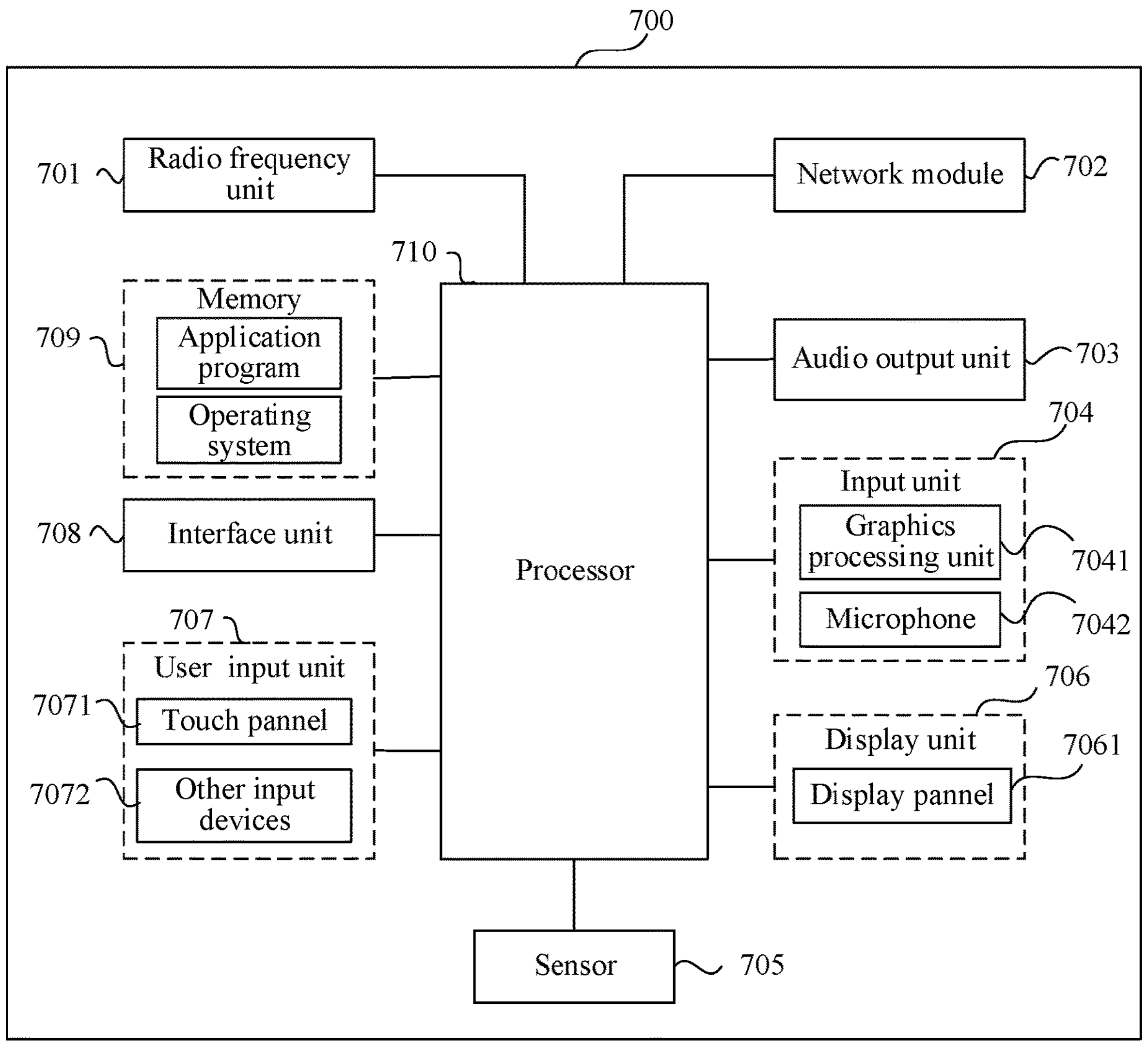
FIG. 7 is a schematic structural diagram of a terminal device according to another embodiment of the present invention.

FIG. 7 is a schematic diagram of a hardware structure of a terminal device for implementing the embodiments of this application.

The terminal device 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

Persons skilled in the art can understand that the terminal device 700 may further include a power supply (for example, a battery) supplying power to the components, and the power supply may be logically connected to the processor 710 through a power management system. In this way, functions such as charge management, discharge management, and power consumption management are implemented by using the power management system. The structure of the terminal device shown in FIG. 7 does not constitute any limitation on the terminal device. The terminal device may include more or fewer components than shown in the figure, or a combination of some components, or the components disposed differently. Details are not described herein again.

It can be understood that in this embodiment of this application, the input unit 704 may include a graphics processing unit (GPU) 7041 and a microphone 7042. The graphics processing unit 7041 processes image data of a still picture or video obtained by an image capture apparatus (such as a camera) in a video capture mode or an image capture mode. The display unit 706 may include a display panel 7061, and the display panel 7061 may be configured in a form of a liquid crystal display, an organic light-emitting diode, and the like. The user input unit 707 may include a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a function key (such as a volume control key or a power on/off key), a trackball, a mouse, a joystick, and the like. Details are not described herein.

In this embodiment of this application, the radio frequency unit 701 receives downlink data from a network-side device, and then sends the downlink data to the processor 710 for processing; and also sends uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions and various data. The memory 709 may include a program or instruction storage area and a data storage area. The program or instruction storage area may store an operating system, an application program or instruction required by at least one function (for example, a sound playback function or an image playback function), and the like. In addition, the memory 709 may include a high-speed random access memory, and may further include a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory, for example, at least one disk storage device, a flash memory device, or another volatile solid-state storage device.

The processor 710 may include one or more processing units. Optionally, an application processor and a modem processor may be integrated in the processor 710. The application processor primarily processes an operating system, user interfaces, application programs or instructions, and the like. The modem processor primarily processes radio communication, for example, being a baseband processor. It can be understood that the modem processor may alternatively be not integrated in the processor 710.

The processor 710 is configured to execute a first target operation in a case that a conditional reconfiguration parameter and/or an SCG deactivation command is received at a first reception occasion, where the first reception occasion includes at least one of the following occasions: a time at which an SCG is deactivated, a time at which a conditional reconfiguration related procedure is being executed, and a time at which an SCG is deactivated and a conditional reconfiguration related procedure is being executed; and the first target operation includes at least one of the following: skipping initiating a conditional reconfiguration evaluation procedure; stopping a conditional reconfiguration evaluation procedure; initiating a conditional reconfiguration evaluation procedure; continuing a conditional reconfiguration evaluation procedure; skipping initiating a conditional reconfiguration execution procedure in a case that a first condition is satisfied; stopping a conditional reconfiguration execution procedure in a case that the first condition is satisfied; postponing initiating a conditional reconfiguration evaluation procedure; postponing initiating a conditional reconfiguration execution procedure in a case that the first condition is satisfied; ignoring the conditional reconfiguration parameter; deleting the conditional reconfiguration parameter; activating or deactivating the SCG; and ignoring the SCG deactivation command.

In an implementation, the executing a first target operation in a case that a conditional reconfiguration parameter and/or an SCG deactivation command is received at a first reception occasion includes: executing the first target operation in a case that the conditional reconfiguration parameter is received when the SCG is deactivated; where the first target operation includes at least one of the following: skipping initiating the conditional reconfiguration evaluation procedure; initiating the conditional reconfiguration evaluation procedure; skipping initiating the conditional reconfiguration execution procedure in a case that the first condition is satisfied; postponing initiating the conditional reconfiguration evaluation procedure; postponing initiating the conditional reconfiguration execution procedure in a case that the first condition is satisfied; ignoring the conditional reconfiguration parameter; and activating the SCG.

In an implementation, the executing a first target operation in a case that a conditional reconfiguration parameter and/or an SCG deactivation command is received at a first reception occasion includes: executing the first target operation in a case that a conditional reconfiguration parameter and/or an SCG deactivation command is received at a first reception occasion, where the first target operation includes at least one of the following: skipping initiating the conditional reconfiguration evaluation procedure; initiating the conditional reconfiguration evaluation procedure; skipping initiating the conditional reconfiguration execution procedure in a case that the first condition is satisfied; postponing initiating the conditional reconfiguration evaluation procedure; postponing initiating the conditional reconfiguration execution procedure in a case that the first condition is satisfied; ignoring the conditional reconfiguration parameter; deleting the conditional reconfiguration parameter; and ignoring the SCG deactivation command. That the conditional reconfiguration parameter and/or the SCG deactivation command is received at the first reception occasion includes: both the conditional reconfiguration parameter and the SCG deactivation command are received; or the SCG deactivation command is received in a case that the conditional reconfiguration parameter has been obtained and that the conditional reconfiguration related procedure has not been executed.

In an implementation, the executing a first target operation in a case that a conditional reconfiguration parameter and/or an SCG deactivation command is received at a first reception occasion includes: executing the first target operation in a case that the SCG deactivation command is received while the conditional reconfiguration related procedure is being executed, where the first target operation includes at least one of the following: stopping the conditional reconfiguration evaluation procedure; continuing the conditional reconfiguration evaluation procedure; stopping the conditional reconfiguration execution procedure in a case that the first condition is satisfied; postponing initiating the conditional reconfiguration execution procedure in a case that the first condition is satisfied; ignoring the SCG deactivation command; and deleting the conditional reconfiguration parameter.

In an implementation, the postponing initiating the conditional reconfiguration execution procedure includes at least one of the following: initiating the conditional reconfiguration execution procedure in a case that there is data or signaling to be sent on an SCG bearer, a secondary node terminated bearer SN terminated bearer, or an MCG bearer; initiating the conditional reconfiguration execution procedure in a case that the SCG has been activated; initiating the conditional reconfiguration execution procedure in a case that an SCG activation command has been activated; and initiating the conditional reconfiguration execution procedure in a case that the SCG is deactivated and an MCG radio link fails.

In an implementation, the initiating the conditional reconfiguration execution procedure in a case that the SCG is deactivated and an MCG radio link fails includes: initiating, for the terminal device, random access on a selected candidate cell; and activating the SCG and/or reporting MCG failure information during a random access procedure or using a radio resource control RRC reconfiguration complete message, where the selected candidate cell includes a cell that meets a corresponding trigger event in the conditional reconfiguration.

In an implementation, the postponing initiating the conditional reconfiguration evaluation procedure includes: storing a CPC configuration; setting a target parameter to a predetermined value; and initiating a conditional reconfiguration evaluation procedure and/or a conditional reconfiguration execution procedure in a case that a second condition is satisfied, where the second condition includes at least one of the following: after the SCG is activated; an SCG activation command has been received and the target parameter is the predetermined value; and the SCG is deactivated and the MCG radio link fails.

In an implementation, the first condition includes: that at least one candidate cell indicated in conditional reconfiguration is triggered; or that a target event corresponding to at least one candidate cell indicated in conditional reconfiguration is satisfied.

In an implementation, the conditional reconfiguration execution procedure includes: determining a first target cell, where the first target cell includes a cell indicated in the conditional reconfiguration; applying an RRC reconfiguration message or parameter corresponding to the first target cell; establishing synchronization with the first target cell; initiating random access to the first target cell; and sending an RRC message to the first target cell.

For the terminal device 700 in this embodiment of the present invention, reference may be made to the processes of the methods 200 to 500 in the corresponding embodiments of the present invention, and the units or modules of the terminal device 700 and other operations and/or functions described above are used to implement the corresponding processes in the methods 200 to 500, with the same or equivalent technical effects achieved. For brevity, details are not repeated herein.

An embodiment of this application further provides a readable storage medium, where a program or instructions are stored in the readable storage medium. When the program or the instructions are executed by a processor, the processes of the foregoing embodiment of the method for executing a target operation can be implemented, with the same technical effects achieved. To avoid repetition, details are not described herein again.

The processor is a processor in the electronic device described in the foregoing embodiments. The readable storage medium includes a computer-readable storage medium, for example, a computer read-only memory (ROM), a random access memory (RAM), a magnetic disk, or an optical disc.

An embodiment of this application further provides a chip, where the chip includes a processor and a communications interface. The communications interface is coupled to the processor, and the processor is configured to run a program or instructions to implement the processes of the foregoing embodiments of the method for executing a target operation, with the same technical effects achieved. To avoid repetition, details are not described herein again.

It should be understood that the chip mentioned in the embodiments of this application may also be referred to as a system-level chip, a system chip, a chip system, a system-on-chip, or the like.

An embodiment of this application further provides a computer program product, where the computer program product includes a processor, a memory, and a program or instructions stored in the memory and capable of running on the processor, and when the program or the instructions are executed by the processor, the steps of the method according to the first aspect are implemented.

It should be noted that the terms “include”, “comprise”, or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by “includes a . . . ” does not preclude the existence of other identical elements in the process, method, article, or apparatus that includes the element. In addition, it should be noted that the scope of the method and the apparatus in the embodiments of this application is not limited to executing the functions in an order shown or discussed, but may also include executing the functions in a substantially simultaneous manner or in a reverse order, depending on the functions involved. For example, the described methods may be performed in an order different from that described, and steps may alternatively be added, omitted, or combined. In addition, features described with reference to some examples may be combined in other examples.

According to the foregoing description of the implementations, a person skilled in the art may clearly understand that the methods in the foregoing embodiments may be implemented by using software in combination with a necessary common hardware platform, and certainly may alternatively be implemented by using hardware. However, in most cases, the former is a preferred implementation. Based on such an understanding, the technical solutions of the present invention essentially or the part contributing to the prior art may be implemented in a form of a software product. The software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of this disclosure.

The foregoing describes the embodiments of this application with reference to the accompanying drawings. However, this application is not limited to the foregoing specific embodiments. The foregoing specific embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A method for executing a target operation, wherein the method is executed by a terminal device, and the method comprises:

executing a first target operation in response to receiving by the terminal device a radio resource control (RRC) reconfiguration message at a time at which a secondary cell group (SCG) is deactivated, wherein the first target operation executed by the terminal device comprises: activating the SCG and initiating a conditional reconfiguration evaluation procedure;

wherein the first target operation executed by the terminal device further comprises the following:

postponing initiating the conditional reconfiguration execution procedure in a case that a first condition is satisfied;

wherein the postponing initiating the conditional reconfiguration execution procedure comprises at least one of the following:

initiating the conditional reconfiguration execution procedure in a case that there is data or signaling to be sent on an SCG bearer, a secondary node terminated bearer (SN terminated bearer), or a master cell group (MCG) bearer;

initiating the conditional reconfiguration execution procedure in a case that the SCG has been activated;

initiating the conditional reconfiguration execution procedure in a case that an SCG activation command has been activated; or initiating the conditional reconfiguration execution procedure in a case that the SCG is deactivated and an MCG radio link fails;

the first condition comprises: that at least one candidate cell indicated in conditional reconfiguration is triggered; or that a target event corresponding to at least one candidate cell indicated in conditional reconfiguration is satisfied.

2. The method according to claim 1, wherein the receiving by the terminal device the RRC reconfiguration message at the time at which the SCG is deactivated comprises:

both the RRC reconfiguration message and an SCG deactivation command are received; or an SCG deactivation command is received in a case that the RRC reconfiguration message has been obtained and that a conditional reconfiguration related procedure has not been executed; and the first target operation further comprises at least one of the following:

initiating the conditional reconfiguration evaluation procedure;

postponing initiating a conditional reconfiguration execution procedure in a case that a first condition is satisfied; or ignoring the RRC reconfiguration message.

3. The method according to claim 1, wherein the initiating the conditional reconfiguration execution procedure in a case that the SCG is deactivated and an MCG radio link fails comprises:

initiating, by the terminal device, random access on a selected candidate cell; and activating the SCG and/or reporting MCG failure information during a random access procedure or using a radio resource control (RRC) reconfiguration complete message, wherein the selected candidate cell comprises a cell that meets a corresponding trigger event in the conditional reconfiguration.

4. The method according to claim 1, wherein the first target operation further comprises: postponing initiating the conditional reconfiguration evaluation procedure, and the postponing initiating the conditional reconfiguration evaluation procedure comprises:

storing a conditional PSCell change (CPC) configuration;

setting a target parameter to a predetermined value; and initiating the conditional reconfiguration evaluation procedure and/or the conditional reconfiguration execution procedure in a case that a second condition is satisfied, wherein the second condition comprises at least one of the following:

an SCG activation command has been received and the target parameter is the predetermined value; or the SCG is deactivated and the MCG radio link fails.

5. The method according to claim 1, the conditional reconfiguration execution procedure comprises at least one of the following:

determining a first target cell, wherein the first target cell comprises a cell indicated in the conditional reconfiguration;

applying an RRC reconfiguration message corresponding to the first target cell;

establishing synchronization with the first target cell;

initiating random access to the first target cell; or sending an RRC message to the first target cell.

6. A terminal device, comprising a processor, a memory, and a program or instructions stored in the memory and capable of running on the processor, wherein when the program or the instructions are executed by the processor, cause the terminal device to perform:

executing a first target operation in response to receiving by the terminal device a radio resource control (RRC) reconfiguration message at a time at which an SCG is deactivated, wherein the first target operation executed by the terminal device comprises:

activating the SCG and initiating a conditional reconfiguration evaluation procedure;

wherein the first target operation executed by the terminal device further comprises the following:

postponing initiating the conditional reconfiguration execution procedure in a case that a first condition is satisfied;

wherein the postponing initiating the conditional reconfiguration execution procedure comprises at least one of the following:

initiating the conditional reconfiguration execution procedure in a case that there is data or signaling to be sent on an SCG bearer, a secondary node terminated bearer (SN terminated bearer), or a master cell group (MCG) bearer;

initiating the conditional reconfiguration execution procedure in a case that the SCG has been activated;

initiating the conditional reconfiguration execution procedure in a case that an SCG activation command has been activated; or initiating the conditional reconfiguration execution procedure in a case that the SCG is deactivated and an MCG radio link fails;

the first condition comprises: that at least one candidate cell indicated in conditional reconfiguration is triggered; or that a target event corresponding to at least one candidate cell indicated in conditional reconfiguration is satisfied.

7. The terminal device according to claim 6, wherein the receiving by the terminal device the RRC reconfiguration message at the time at which the SCG is deactivated comprises:

both the RRC reconfiguration message and an SCG deactivation command are received; or an SCG deactivation command is received in a case that the RRC reconfiguration message has been obtained and that a conditional reconfiguration related procedure has not been executed; and the first target operation comprises at least one of the following:

initiating the conditional reconfiguration evaluation procedure;

postponing initiating a conditional reconfiguration execution procedure in a case that a first condition is satisfied; or ignoring the RRC reconfiguration message.

8. The terminal device according to claim 6, wherein the initiating the conditional reconfiguration execution procedure in a case that the SCG is deactivated and an MCG radio link fails comprises:

initiating, by the terminal device, random access on a selected candidate cell; and activating the SCG and/or reporting MCG failure information during a random access procedure or using a radio resource control (RRC) reconfiguration complete message, wherein the selected candidate cell comprises a cell that meets a corresponding trigger event in the conditional reconfiguration.

9. The terminal device according to claim 6, wherein the first target operation further comprises: postponing initiating the conditional reconfiguration evaluation procedure, and the postponing initiating the conditional reconfiguration evaluation procedure comprises:

storing a CPC configuration;

setting a target parameter to a predetermined value; and initiating the conditional reconfiguration evaluation procedure and/or the conditional reconfiguration execution procedure in a case that a second condition is satisfied, wherein the second condition comprises at least one of the following:

an SCG activation command has been received and the target parameter is the predetermined value; or the SCG is deactivated and the MCG radio link fails.

10. The terminal device according to claim 6, the conditional reconfiguration execution procedure comprises at least one of the following:

determining a first target cell, wherein the first target cell comprises a cell indicated in the conditional reconfiguration;

applying an RRC reconfiguration message corresponding to the first target cell;

establishing synchronization with the first target cell;

initiating random access to the first target cell; or sending an RRC message to the first target cell.

11. A non-transitory readable storage medium, wherein the readable storage medium stores a program or instructions, and a processor executes the program or the instructions to perform the following step:

executing a first target operation in response to receiving a radio resource control (RRC) reconfiguration message at a time at which an SCG is deactivated; and the first target operation comprises:

activating the SCG and initiating a conditional reconfiguration evaluation procedure;

wherein the first target operation executed by the terminal device further comprises the following:

postponing initiating the conditional reconfiguration execution procedure in a case that a first condition is satisfied;

wherein the postponing initiating the conditional reconfiguration execution procedure comprises at least one of the following:

initiating the conditional reconfiguration execution procedure in a case that there is data or signaling to be sent on an SCG bearer, a secondary node terminated bearer (SN terminated bearer), or a master cell group (MCG) bearer;

initiating the conditional reconfiguration execution procedure in a case that the SCG has been activated;

initiating the conditional reconfiguration execution procedure in a case that an SCG activation command has been activated; or initiating the conditional reconfiguration execution procedure in a case that the SCG is deactivated and an MCG radio link fails;

the first condition comprises: that at least one candidate cell indicated in conditional reconfiguration is triggered; or that a target event corresponding to at least one candidate cell indicated in conditional reconfiguration is satisfied.

12. The non-transitory readable storage medium according to claim 11, wherein the receiving the RRC reconfiguration message at the time at which the SCG is deactivated comprises:

both the RRC reconfiguration message and an SCG deactivation command are received; or an SCG deactivation command is received in a case that the RRC reconfiguration message has been obtained and that a conditional reconfiguration related procedure has not been executed; and the first target operation comprises at least one of the following:

initiating the conditional reconfiguration evaluation procedure;

postponing initiating a conditional reconfiguration execution procedure in a case that a first condition is satisfied; or ignoring the RRC reconfiguration message.

* * * * *